(12) United States Patent
Raney (10) Patent No.: US 9,328,810 B2
(45) Date of Patent: May 3, 2016

(54) VARIABLE RATIO GEARMOTOR WITH INTERACTIVE RATIO CONTROL

(75) Inventor: Richard C. Raney, Round Rock, TX (US)

(73) Assignee: Richard C. Raney, Round Rock, TX (US)

( * ) Notice: Subject to any disclaimer, the term of this patent is extended or adjusted under 35 U.S.C. 154(b) by 195 days.

(21) Appl. No.: 11/510,718

(22) Filed: Aug. 28, 2006

(65) Prior Publication Data

US 2008/0051243 A1 Feb. 28, 2008

(51) Int. Cl.
*F16H 37/02* (2006.01)
*F16H 37/08* (2006.01)
*F16H 15/20* (2006.01)

(52) U.S. Cl.
CPC .............. *F16H 37/086* (2013.01); *F16H 15/20* (2013.01)

(58) Field of Classification Search
USPC ........... 475/214, 215, 217, 53, 55; 476/53, 55
See application file for complete search history.

(56) References Cited

U.S. PATENT DOCUMENTS

| | | | |
|---|---|---|---|
| 827,117 A | 7/1906 | Von Pittler | |
| 1,194,107 A | 8/1916 | Whiteside | |
| 1,709,346 A * | 4/1929 | Gargard | 476/53 |
| 1,762,199 A | 6/1930 | Standish | |
| 2,178,859 A * | 11/1939 | Jett et. al. | 475/215 |
| 2,209,023 A * | 7/1940 | Jett | 475/215 |
| 2,574,530 A | 11/1951 | Castagna | |
| 2,580,392 A | 1/1952 | Bade | |
| 2,584,541 A * | 2/1952 | Brobeck | 476/48 |
| 3,195,365 A * | 7/1965 | Coakley et al. | 74/388 R |
| 3,357,277 A | 12/1967 | Alsch | |
| 5,545,101 A | 8/1996 | Kawase et al. | |
| 5,601,509 A | 2/1997 | Munoz | |
| 5,984,820 A | 11/1999 | Wedeniwshi | |
| 6,001,042 A | 12/1999 | Raney | |
| 6,321,613 B1 | 11/2001 | Avidor | |

FOREIGN PATENT DOCUMENTS

GB 2080452 A * 2/1982 ............ F16H 37/08

* cited by examiner

*Primary Examiner* — Ha D Ho
(74) *Attorney, Agent, or Firm* — Hahn Loeser + Parks LLP (57) ABSTRACT

A variable ratio gearbox is combined with a drive motor and an interactive control system. A coaxial shaft connects to a differential gear set to power an output shaft. The transmission has a drive shaft with an inner shaft and an outer shaft. A friction disk nonrotatably mounts to said outer shaft and a shifter connected to the friction disk moves the friction disk along the outer shaft. At least two cones engage the periphery of the friction disk and a differential gear set combines the rotation of the inner and outer shaft.

17 Claims, 6 Drawing Sheets

VARIABLE RATIO GEARMOTOR WITH INTERACTIVE RATIO CONTROL

BACKGROUND OF THE INVENTION

The disclosure pertains to geared drives commonly referred to as "gear motors". Gear motors drive a wide range of different industrial machines, such as pumps, conveyors, rock crushers, rotary kilns, hoists, and some types of vehicles.

Many of these types of machines, such as oil well pumping units, air conditioning compressors, loaded ore conveyors, sand and gravel conveyors, loaded rotary kilns and loaded hoists require relatively high driving torque for starting and bringing up to operating speed. Typically, such machines are started and driven by electric motors acting through fixed ratio gearing and are therefore subjected to high starting loads. Hence, to handle the starting loads, such driving motors are usually sized larger than is required for steady running. It is well known that electric motors are most efficient when sized to be near full load during steady operation. Thus, the high starting loads combined with less than optimum running efficiency causes considerable waste of electric power.

Also, some of these types of machines, such as oil well pumping units, rock crushers, hoists and the like, experience widely varying torque loads during normal operation. Typically, electric motors used for driving such varying loads are the NEMA D "high-slip" type in order to withstand the load variation without overheating or having to be extremely oversized. Of course, both "high-slip" motors and oversized motors are considerably less efficient than correctly sized "low-slip" or "premium efficiency" motors.

In addition, some of these types of machines, such as oil well pumping units, gas compressors, boiler feed pumps and hoists must operate at variable output speeds to accommodate changing operating requirements. Typically, such speed changes are accomplished by electronic speed variation of the drive motor or by hydraulically varying the speed relation between the drive motor and the load. Both of these methods produce undesirable inefficiencies.

Therefore, it is an object of the invention to provide a gear motor having a suitably variable mechanical ratio for driving a wide variety of different machines at suitable speeds and/or variations of speeds in a highly efficient manner; to reduce and/or eliminate inherent motor starting loads; and to facilitate the use of premium efficiency motors instead of other, less efficient types.

SUMMARY OF THE INVENTION

The invention is a combination of an infinitely variable ratio gearbox with an drive motor and an interactive control system. A coaxial shaft connects to a differential gear set to power an output shaft.

The gearbox is arranged to provide infinite ratio at zero output speed whereby the drive motor can be started without load. The control system adjusts the gearbox ratio in a continuous or "step-less" manner in response to a motor load ampere signal so as to provide a smooth, controlled start up and controlled operation of a load. The control system maintains the drive motor at its most efficient speed and load while continuously adjusting the gearbox ratio for optimum output torque and speed for the particular load application.

Output speed can be adjusted either by direct shift of the gearbox ratio or by adjusting the motor ampere load reference signal. For instance, a higher ampere setting will produce higher output acceleration and/or speed while a lower ampere setting will produce lower output acceleration and/or speed. The control system may be arranged for automatic adjustment of the ampere reference signal and/or automatic start up or shut down of the system.

When used in electric powered vehicles, the invention can enable higher output torque at low speeds and higher maximum output speeds for the given drive motor size than conventional methods.

For industrial applications, the drive motor is preferably a poly-phase alternating current motor of the highest efficiency design and is maintained at its most efficient speed. Other types of electric motors may be used for particular applications. For example, direct current motors may be preferred for use in vehicles, especially for battery powered vehicles.

DETAILED DESCRIPTION OF THE INVENTION

Figure 1:
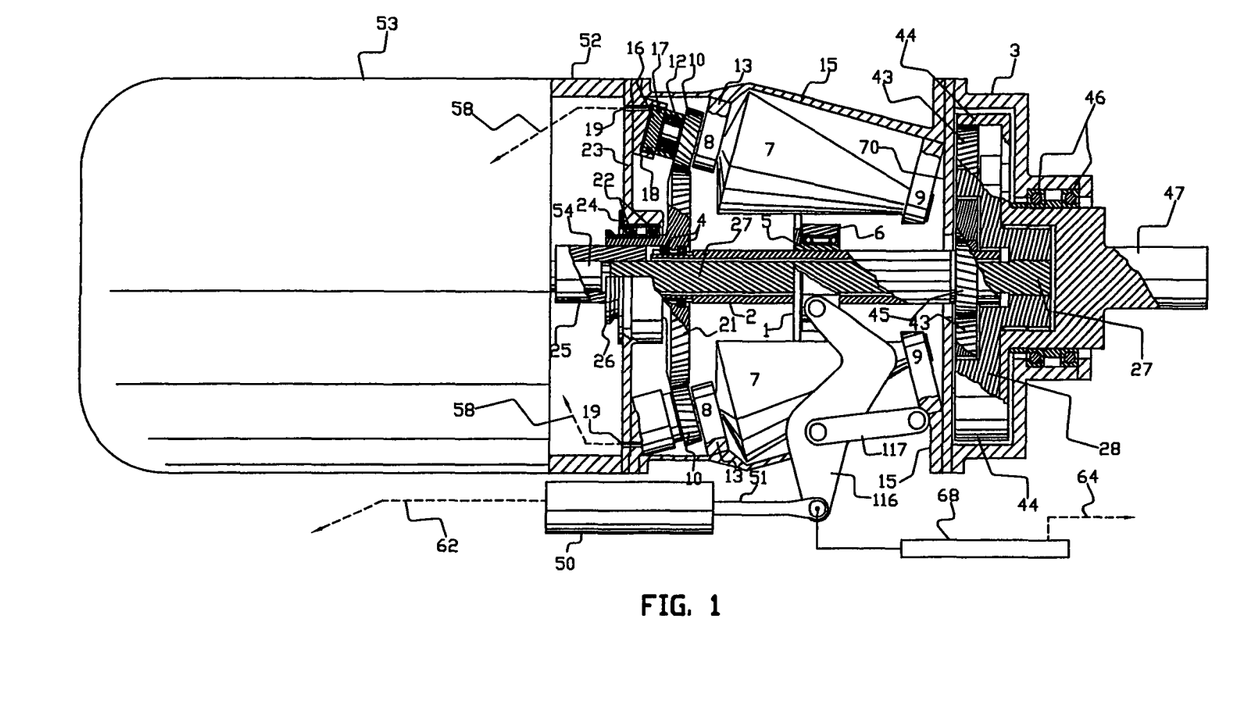
FIG. 1 is a partially sectioned side view of an apparatus formed according to the present invention.

In FIG. 1, an embodiment of the invention is shown in a typical environment wherein the invention is used to drive a machine such as an oil well pumping unit.

The transmission has a central tractionally driven member or disk 1 mounted upon and with a hollow supporting coaxial shaft 2. All elements of the apparatus are located within a housing 3 and cap 15. The shaft 2 is supported on appropriate bearings, such as bearing set 4 at the front end of shaft 2 and an appropriate bearing at its opposite end mounted within the hub of a planet gear carrier 28. Disk 1 is nonrotatably mounted upon a concentric hub 5 by any conventional means such as a spline conforming to and engaging with a straight spline portion of shaft 2. Hub 5 is so arranged to allow disk 1 to travel axially along shaft 2 in a low friction manner while simultaneously transmitting torque cooperatively. Although disk 1 is shown as a single disk, it may be of a multiple disk structure.

A shifting collar 6 connects to hub 5 by means of a bearing such as a thrust bearing within collar 6. Collar 6 is arranged to move axially along shaft 2 to thereby control axial position of disk 1 while allowing free rotation of disk 1 and shaft 2 relative thereto.

An actuator controls the axial position of hub 5 and disk 1. FIG. 1 depicts one type of actuator having a floating lever 116 pivotally mounted to collar 6 and pivotally anchored by a fulcrum link 117 which is in turn pivotally fastened to cap 15 generally as shown. The driven end of lever 116 is pivotally attached to actuating rod 51 of a servo actuator 50. As shown herein, actuator 50 is electrically driven, but could be hydraulically driven.

A plurality of conical rotors 7 are symmetrically positioned circumferentially about disk 1 so that the inwardly facing sides of the cones 7 are parallel to shaft 2 and in frictional engagement with the rim of disk 1. In the present embodiment, five cones 7 may be provided about the periphery of disk 1, though only two are shown. For tractionally driven elements such as disk 1, the fatigue life of the driven element as well as the bearings on which they may be supported, can be calculated using the following commonly known formula:

Life (hours)=$K$/RPM×(Rated Load/Applied Load)$^3$

From this, it should be noted that the applied radial, or normal, traction contact load, which is proportional to torque load, must be held to relatively light limits to prevent rapid fatigue failure. Further, applied load has a much greater effect on fatigue life than does rotational speed of the elements. The torque output from disk 1 is also proportional to the applied traction contact normal load and number of tractional contact points. Again, the optimum number of tractional drive members or cones 7 may be therefore chosen for the particular environment and application of the power transfer system. In the present invention, the preferred embodiment utilizes the maximum number of contact points to provide maximum power output, with final output speed predetermined by a differential gear assembly which will be described hereafter. The disk member 1 as well as the tractional drive member or cone 7 are designed and arranged to sustain extremely high rotating speeds without causing premature failure. The cones 7 of this embodiment are fifteen degree (15°) cones each having approximately four to one (4:1) diametrical ratio, although other embodiments might include cones of a different angle, size and ratio configuration. In this embodiment, the major outside diameter of each cone 7 is approximately equal to the outside diameter of disk 1. U.S. Pat. No. 6,001,042, incorporated herein by reference, shows the cone assembly in more detail.

Each cone 7 includes a concentric shaft extending from each end supported by bearings 8 and 9. A drive gear 10 is provided at its front end, with a thrust bearing 12 supporting the shaft at its front end, as shown. Bearings 8 and 9 are, preferably, needle-type roller bearings capable of sustaining extremely high rotating speeds and relatively high radial loads. Bearings 8 and 9 are mounted in bearing blocks 13 and 14, respectively, which are in turn fastened to a cone assembly cap 15 attachable to the main housing 3. A concentric piston 16 is arranged to abut thrust bearing 12 rearward and to be sealed by means of an o-ring 17 within a forcing cylinder 18. The cylinder 18 in turn abuts the end plate 23 of cap 15 forwardly so that piston 16 applies axial thrust through bearing 12 to cone 7 whenever fluid pressure is directed through a port 19 into cylinder 18 and against piston 16. In this manner, clamping force, or normal force, between cones 7 and disk 1 is achieved to prevent slippage. Bearings 8 and 9, and the mating shaft journals of cone 7, are arranged to allow slight but adequate axial movement of cone 7. Drive gear 10 may be keyed on its shaft and is retained on its shaft by axial force through bearing 12.

As shown in FIG. 1, an input ring gear 21 is provided in common mesh with drive gears 10 at a step-up ratio of 1:5 and is supported in bearing set 22 in association with end plate 23. Bearing set 22 is preferably of the type capable of supporting both radial and axial loads and is retained within plate 23 by a retaining plate 24 and by nut 26 which is in turn installed on the hub of gear 21. Bearing set 4 comprises a pair of opposed thrust bearings arranged to support and control axial force and movement of shaft 2 and is mounted concentrically within gear 21. Gear 21 is arranged to be coupled to and driven by a suitable driver, such as electric motor 53.

Drive motor 53 may be a flange mounted type which may be mounted to plate 23 and cap 15 by means of an adapter ring 52. A sleeve type coupling 25 is keyed to the shaft 54 of drive motor 53 and is splined to the hub of gear 21 and to the end of an internal coaxial shaft 27. The shaft 27 is provided in common mesh with coupling 25 and extends through coaxial bores in other elements of the mechanism rearward where it meshes by splines with planet carrier 28.

A set of differential gears combines the torque of the shafts 2 & 27. One example of the gear set comprises output planet gears 43 which spin on bearings mounted on axially disposed spindles secured to carrier 28. Planet gears 43 are in common mesh with sun gear 45 which is in turn keyed onto shaft 2. Ring gear 44 is also in common mesh with planet gears 43 and the hub of gear 44 rotates on a bearing mounted on the neck of carrier 28. The hub of gear 44 is supported in bearing set 46 and is integral to output shaft 47. Shaft 47 will of course be coupled to drive a load. In this embodiment, the diametrical ratio between ring gear 44 and sun gear 45 is 4.5:1, although other ratios are of course possible.

Parallel or "split torque" transmission of torque is accomplished by the transmission of one torque reaction through gear 21, gears 10, cones 7, disk 1, shaft 2 and sun gear 45 to the differential planet gears 43; and then another torque reaction through shaft 27, through carrier 28 to planet gears 43, which is the other parallel torque path. The differential action of planet gears 43 combines the two separate torques and directs a single torque to ring gear 44. In this manner, the main torque load is transmitted through shaft 27, while the torque load through cones 7 and disk 1 is minimized, yet facilitating the variation of ratio by axial movement of disk 1. A position transducer 88 is attached to the pivot end of rod 51 to provide a ratio position signal for disk 1.

Although not shown herein, the proposed load, being an oil well pumping unit, may include a spring applied and electrically releasable brake for aiding in safely stopping operation whenever power is disconnected.

Figure 5:
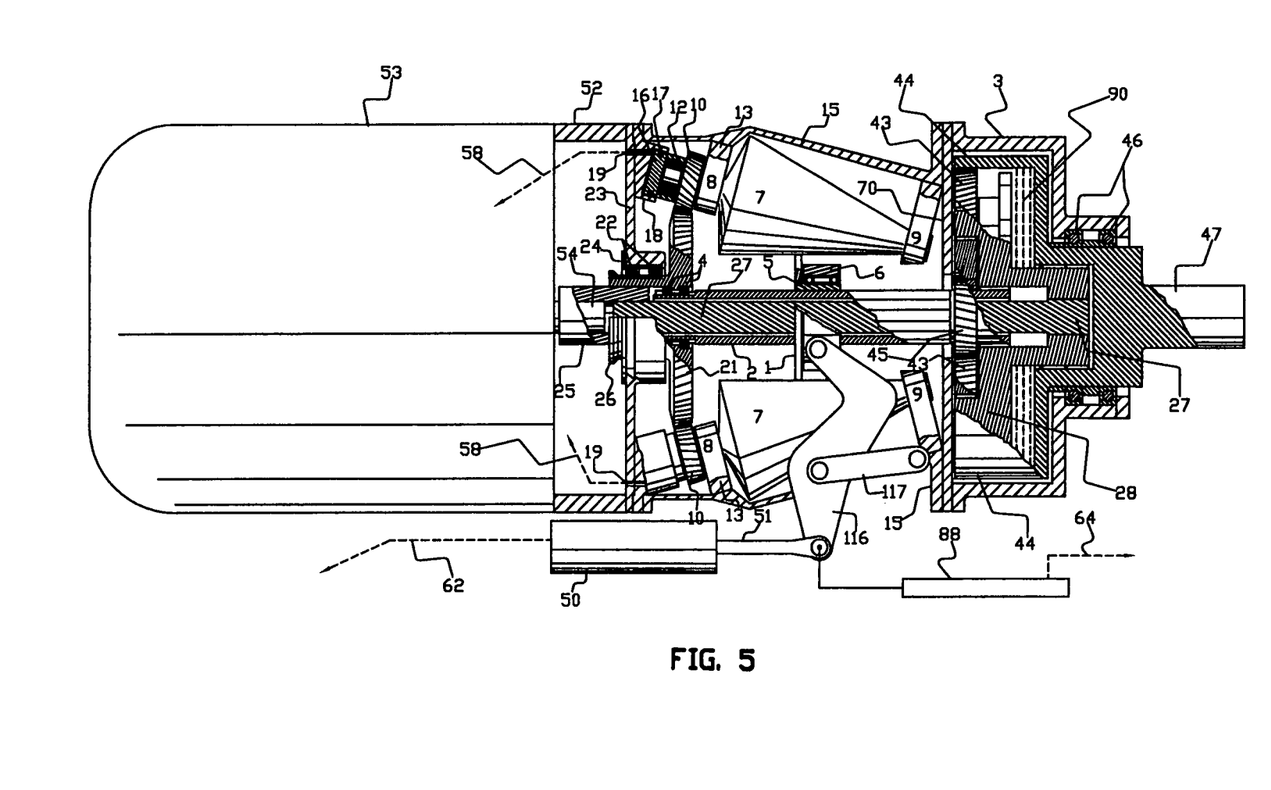
FIG. 5 is a partially sectioned side view of an alternate embodiment of the invention.

Also, as shown in FIG. 5, any conventional clutch 90 may be installed within gear 44 and between gear 44 and carrier 28 to selectively connect gear 44 to carrier 28 in certain applications of the invention. Clutch 90 may be a commercially available type with known characteristics and engagement methods, so its details are not shown here. Its usage will be further explained later.

Figure 2:
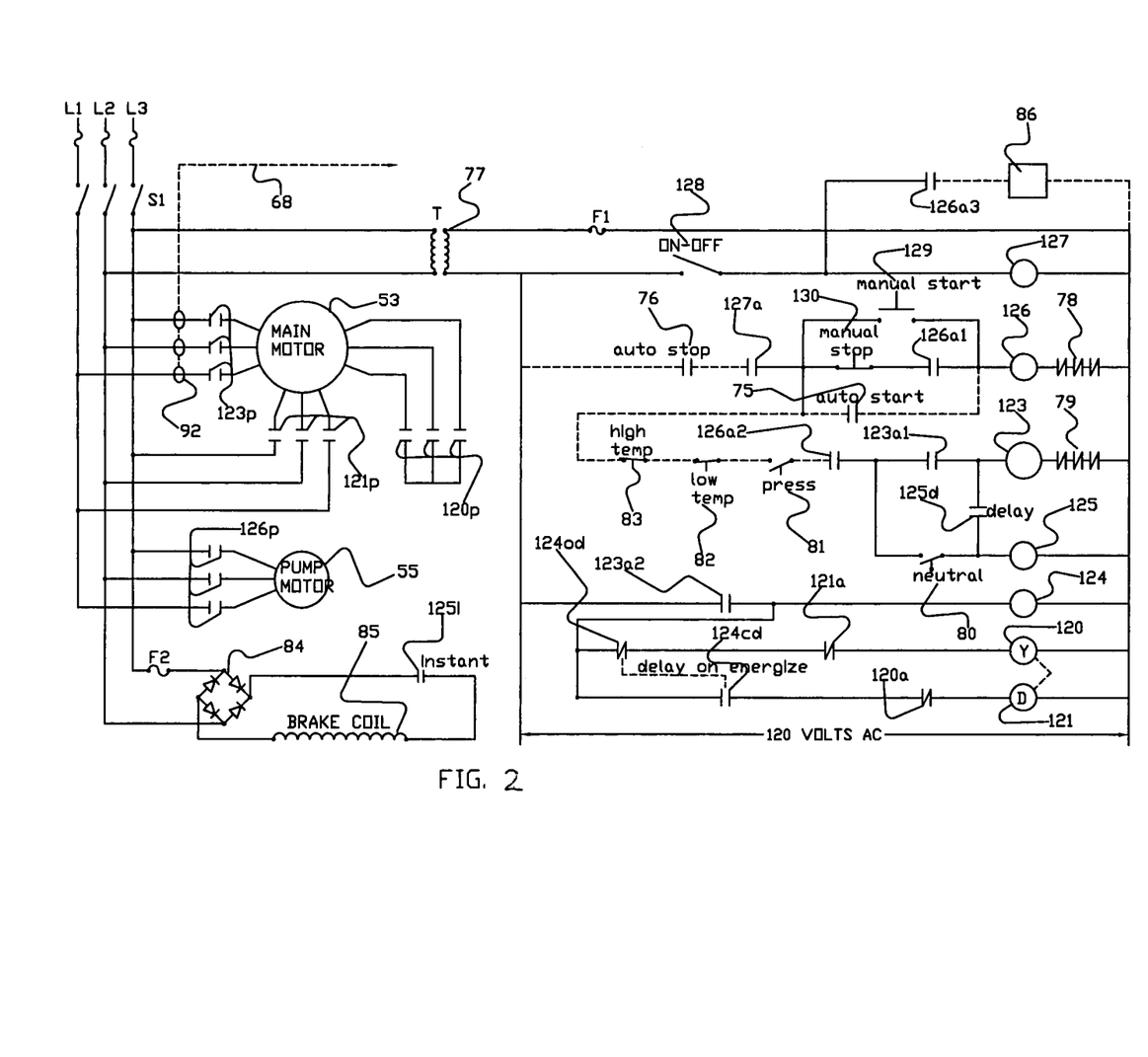
FIG. 2 is a hydraulic schematic illustrating the hydraulic circuit of an embodiment of the invention.

FIG. 2 schematically illustrates a hydraulic system for supplying controlled pressure to pistons 16. The pressure system comprises a pump 55 which would, preferably, be driven by a small drive motor separate from main motor 53. Pump 55 would, preferably, also be a variable displacement type to minimize energy consumption. Pump 55 will intake hydraulic fluid from a sump 60 and supply pressure through line 56 to a pressure control valve 89. Gauge 57 is also connected to line 56 to read out pressure. Valve 89 provides controlled pressure through line 87 through shut off valve 86 to line 58 which is connected to all ports 19 and thus to pistons 16. Shut-off valve 86 should be the normally closed type which opens when energized and closes when de-energized. Also, valve 86 should be equipped with an adjustable bleed-off means so that it can bleed-off pressure in a desired manner. A pressure switch 81 is installed in line 58 to indicate when pressure is up for operation and gauge 59 is connected to line 58 to read out pressure. Valve 89 has a usual drain line into sump 60.

In addition, although not shown herein, a lubrication system will be required to both lubricate and cool various moving components, such as bearings, gears, cones and disks. Since such a lubrication system or methods are commonly known by those skilled in the art, it will not be shown herein.

Figure 3:
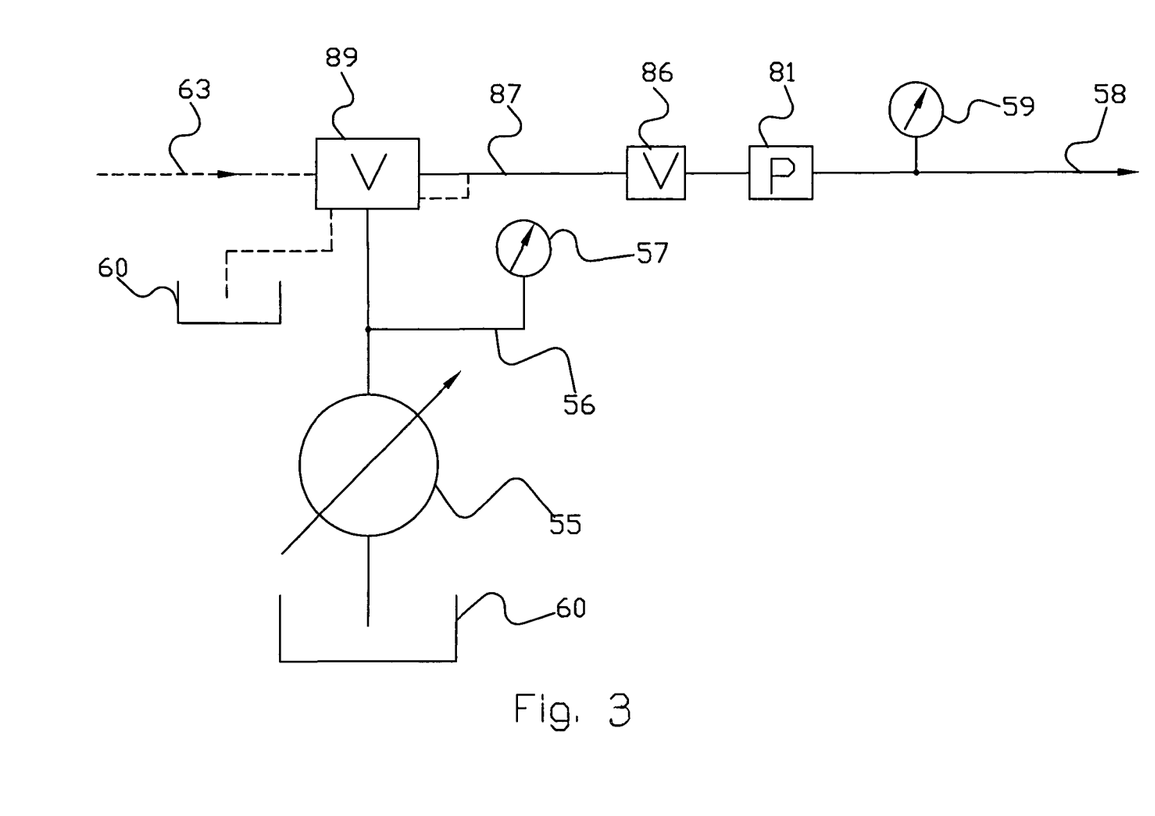
FIG. 3 is an electrical schematic illustrating the power circuits and control circuits of an embodiment of the invention.

FIG. 3 schematically illustrates both the power circuits and control circuits relating to the systems previously described.

Transformer 77 converts the high power line voltage to 120 volt AC control power. Main motor 53 and pump motor 55 are shown connected to the power circuit. Also, a bridge rectifier 84 is connected to the power circuit to supply DC power to a brake coil 85. Usage of brake coil 85 will be explained later.

Pump motor 55 is controlled by a 3-phase starter/contactor which comprise the usual coil 126, power contacts 126p and control contacts 126a1, 126a2 and 126a3 as shown.

Main motor 53 is controlled by a Y/Delta starting system which comprises a main contactor having the usual coil 123 and associated power contacts 123p and control contacts 123a1, 123a2 and 123a3; a Y contactor having the usual coil 120, associated power contacts 120p and a normally closed control contact 120a; and a DELTA contactor having the usual coil 121, associated power contacts 121p and control contacts 121a and 121c. The pump starter/contactor 126 and the main contactor 123 include safety overload tripping contacts 78 and 79, respectively.

A neutral position switch 80 is located in the control circuit so that contactor 123 cannot energize unless actuator 50 and disk 1 are at neutral position. Based on the various component ratios presented herein, the neutral position for disk 1 is near the large end of cones 7 which yields a combined ratio of the mechanism equal to infinity and thus an output speed at shaft 47 equal to zero. Conversely, for lowest combined ratio and maximum output speed at shaft 47, the position of disk 1 will be near the small end of cones 7.

A timing relay 124, having associated delay contacts 124od and 124cd, provides a delayed transfer from Y motor connection for starting to a DELTA motor connection for running. For instance, when main contactor 123 is energized, timer 124 will be energized through the auxiliary contact 123a2 as shown. Also, at this time Y contactor 120 will be energized through the normally closed contacts 124od and 121a. The power contacts 120p will connect motor 53 for Y configuration for low ampere starting. Timer 124 will be set to time out after motor 53 has achieved full speed so that Y contactor 120 will be de-energized and D contactor will 121 be energized through auxiliary contacts 124cd and 120a, as shown. The power contacts 121p connect motor 53 for DELTA configuration for full power running. Contactors 120 and 121 are mechanically interlocked, as denoted by hidden lines, so they cannot both be energize at the same time.

The starter coil 123 is accompanied by a timing relay 125 equipped with both a delay contact 125d and an instant contact 125i. In a starting sequence, relay 125 will be energized first and its instant contact 125i will energize brake coil 85 before contactor 123 energizes motor 53. After coil 85 has sufficient time to begin releasing the brake (approximately 0.5 second), the delay contact 125d will energize contactor 123 which then energizes motor 53 and the subsequent Y/DELTA sequence. Actually, Y/DELTA starting systems are well known to those skilled in the art.

The control circuit may also be equipped with a pilot relay 127 having an auxiliary contact 127a and arranged to be energized through a master ON-OFF switch 128. The circuit may also include a MANUAL START switch 129 and a MANUAL STOP switch 130.

An auto-start contact 75 and an auto-stop contact 76 may be included for automatic starting and stopping the system. Contacts 75 and 76 will be located remotely in a conventional "pump-off control unit" normally found on oil well pumping units. Also, the pressure switch 81 previously mentioned is included in the circuit to prevent start up of main motor 53 until oil pressure and lubrication is up to a preset amount. In addition, thermostatic switches 82 and 83 are included to prevent running of main motor 53 when the oil temperature is not within preset limits.

During any start up sequence, the gearbox ratio is infinity and the torque at shaft 47 is zero until motor 53 reaches operating speed and is switched from Y connection to DELTA connection. Thus, motor 53 always starts at zero load.

A set of current pick up coils 92 are installed on the power conductors to motor 53 to provide a motor load signal through line 68 to the control system to be explained later herein.

Figure 4:
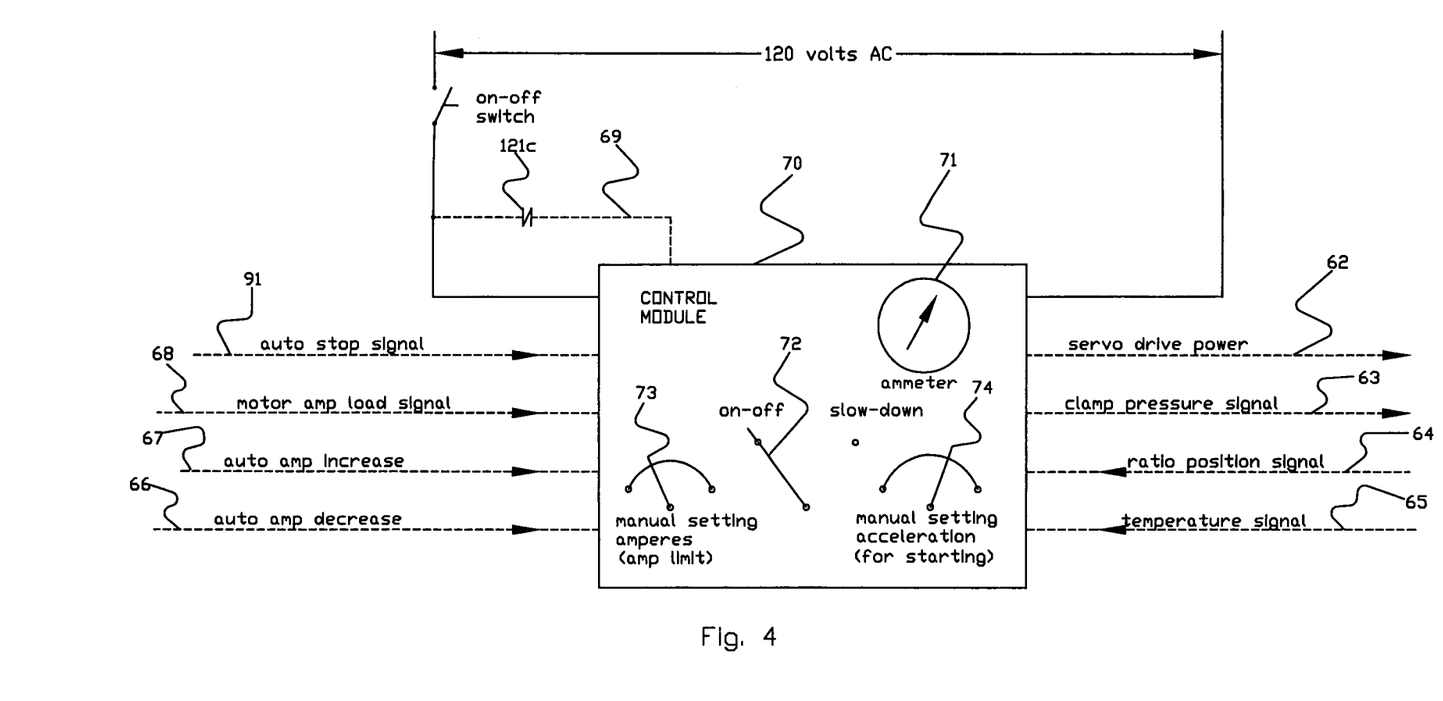
FIG. 4 is a schematic illustration of the control module for an embodiment of the invention.

FIG. 4 schematically illustrates a control module 70 and its associated circuits. Module 70 includes a programmable microprocessor having multiple input and output signal capability. Module 70 also includes a servo drive power supply controllable by the microprocessor.

The face of module 70 may include an ammeter 71 to provide read out of motor load based on the load signal provided through line 68. Module 70 is also equipped with a selector switch 72 for selecting between on/off operating mode and slow-down/speed-up mode. For instance, in on/off mode, a pumping unit will be stopped when a pump-off condition is signaled and restarted automatically by a time clock or the like. In slow-down/speed-up mode, the pumping unit will merely slow down a preset amount when a near pump-off condition is detected and speeded up a preset amount after a preset amount of time to keep the pumping rate just below well production rate.

Module 70 is also equipped with a manual adjustment 73 for setting the ampere rate which controls the servo driver. In addition, module 70 is equipped with a manual adjustment 74 for setting the rate of ampere rise during startup, which determines the output starting torque and acceleration. Adjustment 74 will be set to provide an optimum acceleration rate which does not overload the mechanism of the gear box or the mechanism of the pumping unit.

Module 70 receives seven input signals and produces one output signal plus output servo power. For instance, voltage through normally closed contact 121c through line 69 signals module 70 to position servo actuator 50 for zero motor load and to an infinite ratio or "neutral" position. Servo drive power is directed through line 62 while the servo/ratio position signal is received through line 64.

Of course, when motor 53 is running, the normally closed contact 121c shown in FIG. 4 is open so that the servo driver can position actuator 50 according to the ampere load setting. Thus, based on the motor load signal received through line 68, the servo driver will continually position actuator 50, and thus the ratio of disk 1, so as to maintain the set motor load. During this time, based on the combined signals from line 64 for ratio position, from line 65 for oil temperature and from line 68 for motor load, clamp pressure signal through line 63 is modulated to maintain optimum pressure to pistons 16 to prevent slippage between disk 1 and cones 7 at the prevailing torque load.

Such applications such as an oil well pumping unit experience drastic load fluctuations during each cycle of the pumping unit during operation. Hence, in working to keep motor load at the set ampere rate, the servo driver of module 70 will continually position actuator 50 and disk 1 in phase with the changing torque load of the pumping unit. For instance, as torque load at shaft 47 increases, disk 1 will be continually shifted to a higher ratio as shaft 47 slows and the torque load on motor 53 holds steady. As torque load at shaft 47 decreases, disk 1 will be continually shifted to a lower ratio as shaft 47 speeds up and the load on motor 53 remains steady. Although the pumping unit will speed up and slow down during each stroke cycle, a given motor ampere setting will produce a given overall stroke rate. The motor ampere setting is increased to increase the stroke rate and the ampere setting is decreased to reduce the stroke rate.

When operating in the slow-down/speed-up mode, selector 72 will be in the slow-down position. The pumping unit will normally be equipped with a conventional "pump-off controller" (not shown) which can supply an auto ampere decrease signal through line 66 whenever a near pump-off condition is detected. Module 70 will be pre-programmed to automatically reduce the ampere setting a preset amount whenever an auto ampere decrease signal is received. Thus, the pump stroke rate will be reduced so as to not pump-off the well, which might cause pump cavitation and possible damage. In addition, the conventional "pump-off controller" may be equipped with a timing device to periodically send an auto ampere increase signal to module 70 which may be programmed to slightly increase the ampere rate and thereby the stroke rate. In this manner, the stroke rate may be adjusted to an optimum rate without causing an actual pump-off condition.

When operating in the on/off mode, selector 72 will be in the on/off position. In this mode, whenever the conventional "pump-off controller" detects a near pump-off condition it can send an auto stop signal through line 91 to module 70 which then initiates a pump shut down sequence. In a shut down, the auto stop contact 76, shown in FIG. 2, (included in the "pump-off controller") will open which de-energizes contactor 126 which in turn de-energizes contactors 123 and 121 and relay 125. Contact 126a3 opens to de-energize valve 86 when contactor 126 is de-energized. Thus, valve 86 closes to hold clamping pressure on pistons 16 to prevent slippage between cones 7 and disk 1 during shut down. Valve 86 should be adjusted to allow sufficient bleed off of pressure after shut down so that disk 1 can safely move axially without rotating. Also at this time, 125i opens to de-energize brake coil 85 setting the brake on the pumping unit. The brake will be adjusted to bring the pumping to a soft stop and prevent roll-back. Also, during this time, contact 121c shown in FIG. 4 closes to provide a signal through line 69 which directs module 70 and the servo driver therein to position actuator 50 and disk 1 to neutral position. Thus, the pumping unit, motor 53 and the entire mechanism will be brought to a stop.

Likewise, in the event of an unplanned shut down, such as loss of electric power during a lightning storm, shut down will occur in the same manner as previously described, except that module 70 and the servo driver will not return disk 1 to neutral position until electric power is restored.

To automatically restart, the conventional "pump-off controller" will include the auto-start contact 75, shown in FIG. 2, which may close at a preset time. Start up is thus achieved in the manner previously described.

In some applications, other than and unlike oil well pumping units, the load needs to run at a steady speed when up to speed and in operation. In such steady speed applications, an arrangement such as clutch 90 shown in FIG. 5 previously mentioned, can be utilized to connect carrier 28 to the hub of gear 44 after gear 44 has been brought up to operating speed. In this manner, the driving torque from motor 53 can be directly transmitted through shaft 27, to carrier 28, through clutch 90 to ring gear 44, and out through output shaft 47 without need of any torque load on disk 1 during steady running.

In order to utilize clutch 90, the ratios of gears 21, 10, 45, 43 and 44, as well as the cone-to-disk ratio, must be arranged so that when disk 1 reaches the small end of cones 7 during acceleration, the speed of ring gear 44 is equal to the speed of carrier 28, which enables smooth engagement of clutch 90.

When clutch 90 is thus engaged, module 70 and the servo driver may be programmed to keep disk 1 at a synchronized position which prevents torque application to disk 1. Also, during this time the clamping pressure through line 58 to pistons 16 can be reduced to a minimum amount whereby disk 1 and cones 7 and associated bearings are not subjected to any consequential stress or wear during steady operation of a load.

Figure 6:
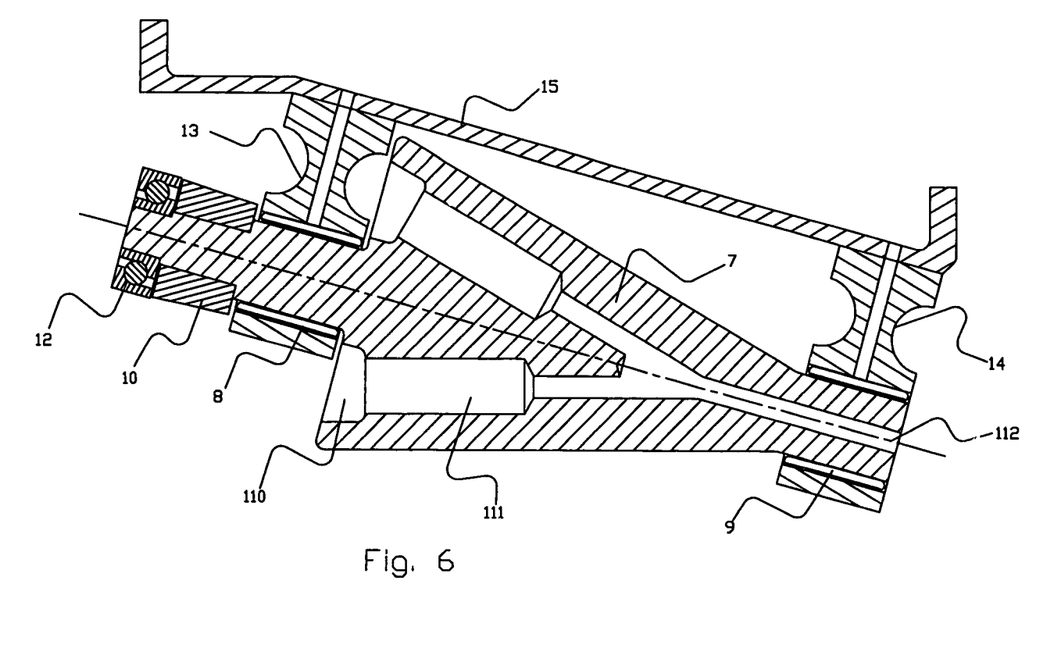
FIG. 6 is a cross sectional view of an alternative embodiment of the cone.

An alternative cone, depicted in FIG. 6, has a circumfrentially extending lightening groove 110 formed in the end face of the cone and communicating with lightening holes 111. While any number of holes may be used, it is envisioned that each cone will have six. The lightening holes 111 meet at a common point and a cooling oil passage 112 extends from this point to the opposite end face of the cone.

While the invention has been described with reference to preferred embodiments, a wide range of sizes, variations, alterations or modifications of the invention are possible without departing from the intent and scope of the invention.

What is claimed is:

1. A transmission comprising
   a drive shaft, said drive shaft having an inner shaft and an outer shaft,
   a friction disk nonrotatably mounted to said outer shaft,
   a shifter connected to said friction disk, said shifter comprising a collar connected to said disk, a lever extending from said collar, and an actuator connected to said lever, wherein said shifter moves said friction disk along said outer shaft,
   at least two cones engaging the periphery of said friction disk, and
   a differential gear set combining the rotation of said inner and outer shaft.

2. The transmission of claim 1, further comprising an output shaft connected to said differential gear set.

3. The transmission of claim 1, wherein said actuator comprises a piston and cylinder.

4. The transmission of claim 1, wherein said actuator is an electric servo actuator.

5. The transmission of claim 1, wherein
   said differential gear set comprises a sun gear connected to said outer shaft,
   planet gears meshing with said sun gear,
   a planet gear carrier attached to said planet gears, and
   a ring gear surrounding and meshing with said planet gears.

6. The transmission of claim 5, further comprising an output shaft unitarily formed with said ring gear.

7. The transmission of claim 1, including a clutch for connecting said inner shaft to said output shaft.

8. The transmission of claim 1, wherein each cone has a lightening groove formed in the end face of the cone and communicating with lightening holes within the cone.

9. The transmission of claim 8, further comprising a cooling oil passage extending from the lightening holes to the opposite end face of the cone.

10. A transmission comprising
    a drive shaft, said drive shaft having an inner shaft and an outer shaft,
    a friction disk nonrotatably mounted to said outer shaft,
    a system for moving said friction disk along said outer shaft comprising an actuator operably coupled to the friction disk to cause movement thereof, the actuator comprising a piston and cylinder,
    at least two cones engaging the periphery of said friction disk, and
    a differential gear set combining the rotation of said inner and outer shaft.

11. The transmission of claim 10, wherein said system for moving said friction disk comprises a collar connected to said disk,
a lever extending from said collar, and the actuator connected to said lever.

12. The transmission of claim 10, wherein said actuator is an electric servo actuator.

13. The transmission of claim 10, wherein said differential gear set comprises a sun gear connected to said outer shaft, planet gears meshing with said sun gear, a planet gear carrier attached to said planet gears, and a ring rear gear surrounding and meshing with said planet gears.

14. The transmission of claim 10, further comprising an output shaft unitarily formed with said ring gear.

15. The transmission of claim 13 including a clutch for connecting said inner shaft to said ring gear.

16. A transmission comprising
a drive shaft, said drive shaft having an inner shaft and an outer shaft,
a friction disk nonrotatably mounted to said outer shaft,
a shifter connected to said friction disk, said shifter moving said friction disk along said outer shaft,
at least two cones engaging the periphery of said friction disk, and
a differential gear set combining the rotation of said inner and outer shaft, wherein said differential gear set comprises a sun gear connected to said outer shaft, planet gears meshing with said sun gear, a planet gear carrier attached to said planet gears, and a ring gear surrounding and meshing with said planet gears.

17. A transmission comprising
a drive shaft, said drive shaft having an inner shaft and an outer shaft,
a friction disk nonrotatably mounted to said outer shaft,
a system for moving said friction disk along said outer shaft,
at least two cones engaging the periphery of said friction disk, and
a differential gear set combining the rotation of said inner and outer shaft, wherein said differential gear set comprises a sun gear connected to said outer shaft,
planet gears meshing with said sun gear, a planet gear carrier attached to said planet gears, and a ring rear surrounding and meshing with said planet gears.

* * * * *